Feb. 18, 1941.   T. R. MERTON   2,232,551
METHOD OF PREPARING DIFFRACTIVE FOILS AND
OTHER BODIES WITH DIFFRACTIVE SURFACES
Filed Dec. 18, 1936   3 Sheets-Sheet 1

INVENTOR
Thomas Ralph Merton

HIS ATTORNEYS

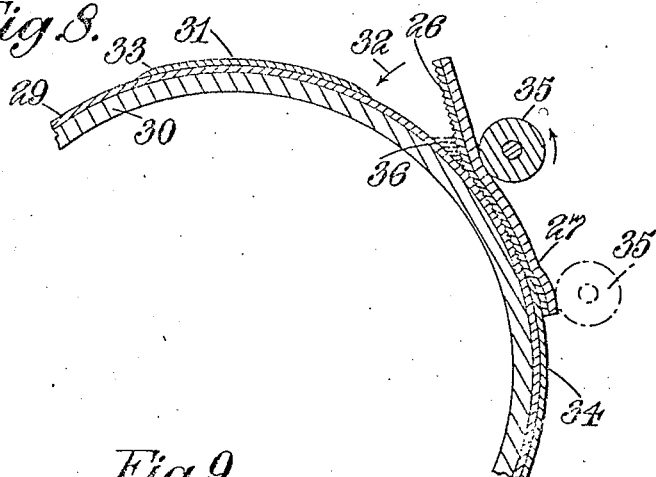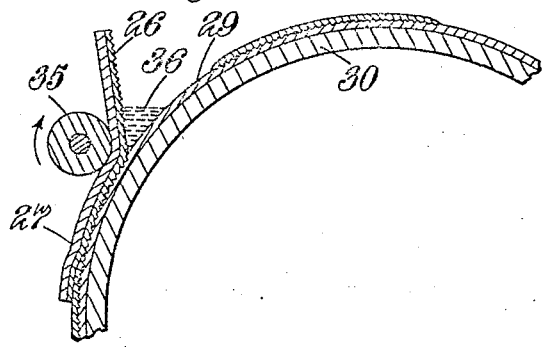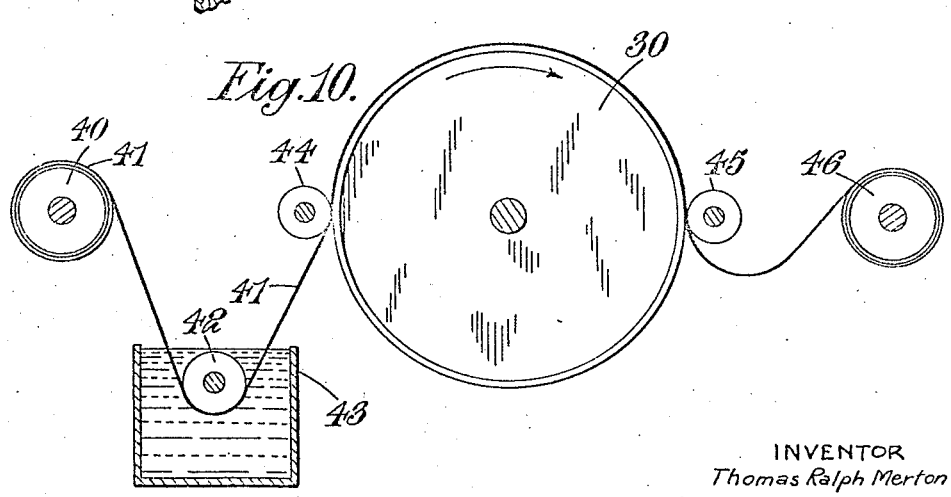

Patented Feb. 18, 1941

2,232,551

UNITED STATES PATENT OFFICE 2,232,551

METHOD OF PREPARING DIFFRACTIVE FOILS AND OTHER BODIES WITH DIFFRACTIVE SURFACES

Thomas Ralph Merton, Hereford, England

Application December 18, 1936, Serial No. 116,662
In Great Britain January 10, 1936

5 Claims. (Cl. 18—57)

This invention comprises diffractive foils and other bodies with diffractive surfaces and methods of preparing the same.

Closely ruled diffraction gratings are very expensive and it is already known to prepare economical duplications of such gratings in collodion by casting a collodion solution as a thin film upon the surface of a master diffraction grating, then allowing the skin to dry by evaporation of the solvent vehicle and subsequently detaching the skin from the master grating. Such a detached skin carries a mirror-image of the rulings of the master grating and may be mounted for use on a glass plate or prism, so producing a diffraction grating which is economical to prepare but which is sufficiently good for non-critical work.

The production of collodion grating-images according to this method is a somewhat lengthy and tedious procedure and requires considerable manipulative skill. Evaporation of the solvent vehicle of the collodion solution cannot be hurried otherwise the film becomes reticulated and irregular in thickness.

It is an object of the present invention to provide means whereby gratings may be duplicated rapidly and, if desired, over areas which are large compared with the ruled area of the master grating. It is a further object of the invention to provide means for utilising such duplicate gratings in the manufacture of foils capable of yielding diffraction effects or of surfaces on other substances yielding diffraction effects for the purpose of decoration.

The present invention comprises a method of reproducing from an original diffraction surface a copy thereof which consists in applying directly to the surface of the original a material capable of taking an impression or cast therefrom, thus forming one or more primary negative replicas, stripping therefrom the primary negative replica or replicas, then making one or more positive replicas of the original grating by applying directly to the said primary negative replica or replicas a second material which does not dissolve or mix with the said negative replica or replicas and is capable of taking an impression or cast therefrom, thereafter separating the second material and primary negative replica from each other, and then in like manner making further replicas from the said positive replica or replicas.

The invention further comprises a method of reproducing from an original diffraction surface a copy thereof of area larger than the original, which consists in taking directly from the original in a material capable of taking an impression or cast therefrom a plurality of casts to form negative replicas, and using these juxtaposed as dies in the formation of a larger positive replica of the diffraction surface in a second material which in the direct casting operation does not dissolve or mix with the first.

The material for making any of the said replicas may be a swollen gelatinous material which has the impression produced thereon by being allowed to dry in direct contact with the surface from which the impression is taken. The gelatinous material may be glue containing a hardening agent and may be subjected to treatment for the purpose of hardening it after the surface from which the impression has been taken has been stripped off.

The replicas may be made of cellulosic material. It will be observed that the gelatinous materials and cellulosic materials belong to classes of organic substances of which the one class is softened by aqueous agents which have no solvent effect upon the materials of the other class, which are softened by reagents such as acetone. Instead of employing as originals and replicas gelatinous materials and cellulosic materials it is possible for a replica to be made from a cellulosic material and a replica thereof from another cellulosic material of a kind softened by an order of reagent which has no solvent effect on the first mentioned replica.

The invention further comprises a method of preparing a diffraction surface of a desired area larger than an original diffraction surface which consists in forming from the said original a cast thereof by applying directly thereto a material which is thereafter stripped therefrom, then forming therefrom a plurality of casts by bringing it in contact with a material which is capable of being separated therefrom after casting, then using these casts juxtaposed as dies to form in like manner an enlarged die-surface from which in turn a series of further casts is taken by applying directly a material which in every case is capable of being stripped from the dies after casting if and so far as may be necessary to build up a still further enlarged diffraction surface of the desired area and using the said diffraction surface having the desired area as a matrix for the production of casts in a material which is capable of being stripped from the said matrix. In this connection it will be understood that the term "original grating" means any diffraction surface used as a starting point and that the term "casting" includes any method of moulding one surface from another either by pouring liquid material thereon or pressing a previously formed but soft surface thereon or otherwise.

The material of which the said matrix is composed may consist of a glue (for instance a photo-engraving glue) containing a hardening agent and may be subjected to heat for the purpose of hardening it.

The enlarged diffraction surface produced by the method as hereinbefore indicated may be employed as a die or matrix to form a diffraction surface upon a thin continuous film or sheet of a cellulosic, alginic or like material such, for example, as the thin transparent cellulosic material sold under the registered trade-mark "Cellophane."

It is an important feature of the present invention that such material may be preformed, treated with a solvent or softening agent sufficient to bring it to a soft state and then dried while in contact with the die or matrix. Preferably the diffraction surface is formed on a roller and the film or sheet material is treated with a solvent by applying the solvent to the roller and pressing the film or sheet material thereon.

According to a further feature of the present invention a method of executing a design on a surface consists in arranging the material of the surface in separate moulded diffraction-areas the boundaries of which correspond to the design.

One specific method of carrying out the invention which will now be described by way of example with reference to the accompanying drawings which illustrate in the successive figures the steps in the process:

Figure 6:
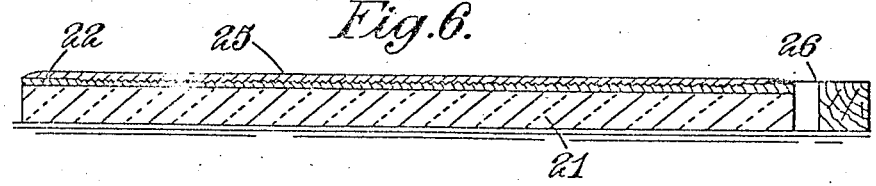
Figure 7:
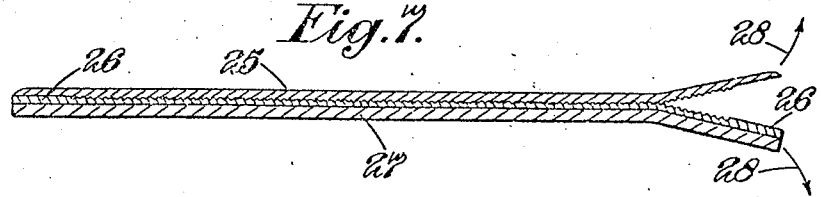
Figure 11:
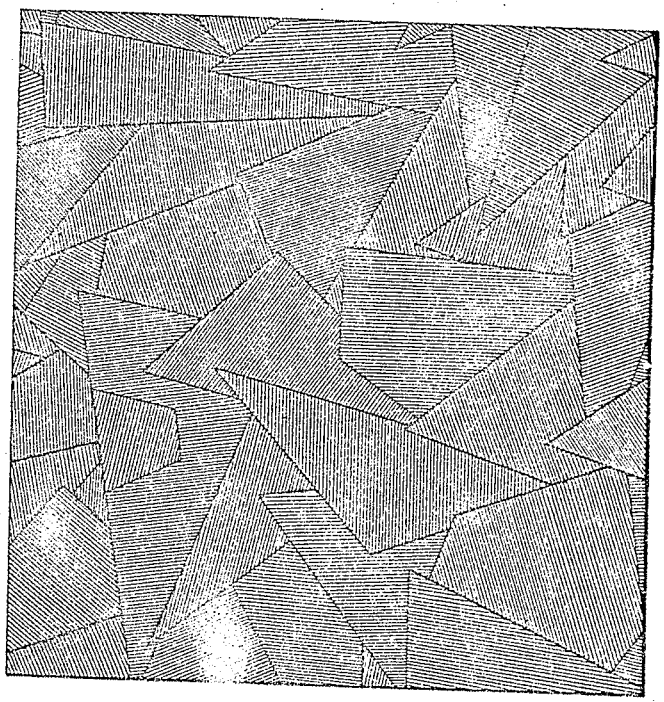

Figure 6 the cast of large collodion skins therefrom;

Figure 7 the manufacture of a gelatine impression therefrom;

Figure 8 the preparation of an enlarged diffraction surface around a portion of a cylinder;

Figure 9 the completion of the same,

Figure 10 is a diagram of the manufacture of continuous lengths of transparent foil upon a cylinder provided with a diffraction surface, and Figure 11 is an example of a surface bearing a design on diffraction surfaces in accordance with the invention.

In the manufacture of flexible materials of large area carrying diffraction gratings according to the invention, it is first necessary to multiply and duplicate a diffraction grating from a master grating over a large area. The master grating may be any original desired, for example it may be ruled on speculum metal with, say, 20,000 lines per lineal inch. As will be evident the degree of perfection of the master grating employed will determine the brilliance of the products. The first operation is to cast a skin of pyroxylin on the master grating in known manner. This is done by pouring a solution of pyroxylin, dissolved in amyl acetate in the proportion of 5 parts by weight of pyroxylin to 100 parts of solvent. This is then dried, which will take about 24 hours at room temperature.

Figure 1:
Figure 1 is a diagrammatic section of a master grating with a collodion skin thereon.

In Figure 1, 11 represents the master grating and 12 the pyroxylin skin poured thereon. The thickness of the skin and the dimensions of the lines 13 ruled on the master grating are greatly exaggerated in Figure 1 in order to render them clearly visible.

The quantity of solution employed needs to be carefully regulated so as to obtain a skin of the desired thickness. Too little will yield a skin which is too thin to be properly handled and too much will lead to poor drying, the surface of the back of the skin becoming reticulated.

Figure 2:
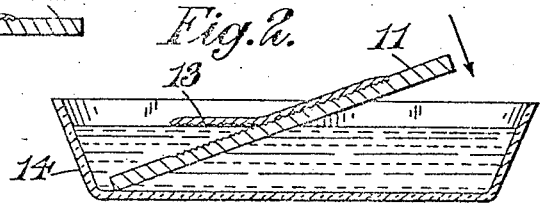
Figure 2 is a diagram illustrating the collodion skin from a grating.

After drying, the grating and adherent skin are placed in a photographic dish 14, Figure 2, containing water at about 40° C. After an immersion period of approximately 5 to 15 minutes, the collodion skin becomes detached from the grating and if the grating 11 is lifted from the dish with the loosened skin upon it and then lowered into the dish slantwise, as illustrated in Figure 2, the skin will float itself off, remaining on the surface of the water. The skin carries a mirror-image of the rulings on the master grating and this is to be used in making a primary replica of the master grating.

Figure 3:
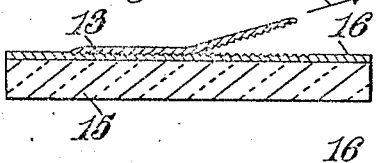
Figure 3 illustrates the method of applying the said collodion skin to and stripping it from a gelatine surface.
Figure 4:
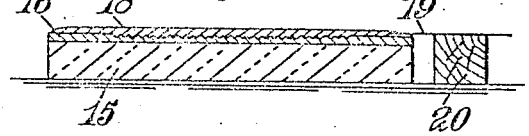
Figure 4 illustrates the casting of further collodion skins from the gelatine surface.

Referring to Figure 3, 15 represents a photographic plate having a gelatine surface 16. Preferably the silver emulsion is removed by fixing the plate in hypo and washing. Subsequently the plate is soaked with a hardening agent, for example a 1% solution of ammonium or potassium dichromate for ten minutes. On the wet plate the collodion skin 13 in the dish 14 is gently floated and on lifting the photographic plate out of the dish 14 the skin will remain upon it. The position of the skin relatively to the gelatine can then be adjusted, a sheet of blotting or filter paper passed over the skin and the whole squeegeed together. The skin and the plate are put aside to dry and when thoroughly dry the skin 13 is pulled off. This can easily be done by carefully lifting one edge with a spatula or knife and then pulling in the direction indicated by the arrow 17, Figure 3. The gelatine 16 now displays a brilliant replica of the original master grating. It can be hardened if desired by exposure to light if dichromate has been used. Alternatively it can have been soaked in formalin before moulding so that the formalin hardens it on drying. It can be regarded as a kind of master grating which, being less expensive than a ruled master grating such as the ruled grating 11, Figure 1, can be employed with more freedom in the production of further collodion skins. It is necessary for the production of a large diffraction surface according to this invention to prepare a considerable number of collodion skins. For this purpose the plate 15 with its hardened gelatine coating 16 is laid on a flat surface and collodion skins 18 are poured upon it, dried and stripped one after another until a sufficient number have been collected. Before pouring the skins two small pieces of cotton or silk 19 are laid on the gelatine surface just outside the ruled area thereon so that the solution overlaps the threads when spread over the plate. Conveniently a small stick of wood 20, such as a matchstick, supports the cotton threads during the pouring operation to prevent the threads from hanging down and syphoning the collodion solution away while it is wet. These threads facilitate subsequent stripping of the collodion film from the gelatine grating. After allowing the collodion to dry for approximately twenty-four hours detachment is effected by starting to strip by lifting one or both of the threads 19, then running a spatula round the edge of the collodion film so as to free it and then stripping it off, pulling in the direction indicated by the arrow 17 in Figure 3. It should be noted that this detachment must be effected dry without the floating operation indicated in Figure 2.

Figure 5:
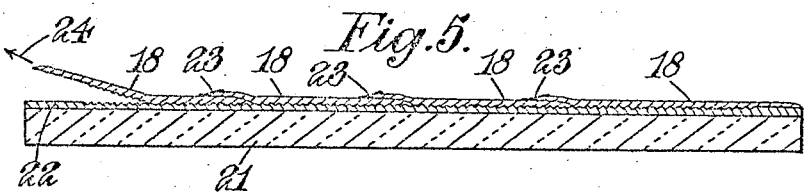
Figure 5 illustrates the manufacture of an enlarged grating in gelatine.

When a sufficient number of collodion skins 18 have been made a large gelatine duplicate can be made on a glass plate 21 (Figure 5) which is covered with a gelatine film 22, containing a hardening agent similar to that on the film 16 in Figure 3. The skins 18 are first trimmed and are then laid on the surface 22 while the latter is wet, if desired, so that they overlap one another at their edges. The junctions are preferably painted with glue as indicated at 23. The skins can either be laid regularly so as to cover the whole of the surface with a uniform series of ruled lines or they can be laid with any desired pattern. After drying off the water as before the skins can be stripped. If lifting is started with the skin which was first laid and this is pulled off in the manner indicated by the arrow 24, Figure 5, the other skins will be lifted off with it one after another.

The plate 21 now carries an enlarged diffraction area and can be used as indicated in Figure 6 for pouring a correspondingly large collodion film 25 provided as before with cotton or silk threads 26 at the corners to facilitate stripping.

The operations above described can be repeated if desired, using a number of the larger skins such as 25 lapped together on a still larger glass plate so as to provide a further enlarged diffractive area.

When a diffractive area of the required size and pattern has been produced on a large enough collodion skin or skins by the methods above described the possibility comes into view of preparing a cylinder carrying a diffractive surface so that the surface may be reproduced by the cylinder on a continuous length of thin transparent foil. If the foil to be produced is a material such as cellulose acetate, which is ordinarily prepared by casting a thin film upon a rotating cylinder, the surface of the cylinder may be provided with a diffractive surface moulded in a gelatinous substance or photo-engraving glue applied direct to the cylinder and formed with diffractive lines by applying the collodion skins directly thereto. If, however, the foil which is to be rendered diffractive is made of regenerated cellulose, such as "Cellophane," the step of impressing the lines upon the "Cellophane" is conducted by bringing a water-resistant material such as pyroxylin into close contact with the cellulosic material while the latter is wet and the steps necessary for the latter process are those which have been illustrated in the drawings.

Referring to Figure 7, this shows a collodion skin 25 after it has been squeegeed into close contact with the gelatine surface 26 on a paper backing 27. Gelatined paper, similar to photographic paper, can be employed for this purpose. The paper and gelatine are soaked in water before being squeegeed together with the collodion 25. The latter operation can be conducted by passing the two sheets together through rubber-covered rollers like a mangle. After the material has dried it is split apart as indicated by the arrows 28 at the right hand side of Figure 7. This is, of course, a delicate operation which may require the co-operation of more than one operator.

The next operation is to mould a diffractive surface on a cylinder from the gelatine-coated paper 27. To this end a cylinder 30, Figure 8, having a smooth metallic surface, for example of brass, and of a suitable diameter, say 4 feet, is taken and covered with a layer of Celluloid 29 by any appropriate process. A protective coating of glue 31 is applied over a portion of the surface of the cylinder, the edges 32, 33 of the glue being parallel with the axis of the cylinder. At a suitable spacing from the glue-covered strip there is a second strip 34 of glue, the distance between the edges of the strips 31, 34 being somewhat less than the width of the diffractive surface on the paper 27. The paper 27 is laid with one edge overlapping the glue 34 and with a squeegee roller 35 pressing on this edge as indicated in chain lines in Figure 8. Into the V-shaped gap between the paper 27 and the surface 29 of the roller 30 there is poured a small quantity of pyroxylin solution 36 and this is pressed out over the surface of the roller 30 by advancing the squeegee roller 35 and gradually squeegeeing the gelatine paper down on the roller surface, as indicated in Figure 8. Any excess of pyroxylin solution will spread over the surface of the glue 31 and can be wiped off.

The whole surface of the solution is covered in this way by alternate strips of glue such as 31, 34 and of paper which has been squeegeed between the strips of glue.

When all is dry the paper is stripped away and the glue is washed off. The strips which have been previously rendered diffractive are now in their turn protected by a layer of glue and the strips which were previously covered with glue have sheets of diffractive gelatine-covered paper such as 27 applied to them with pyroxylin solution squeegeed between as shown at 36, Figure 9. In this way the remaining surface of the cylinder is rendered diffractive. If the strips of glue are made thin and the squeegeeing is carefully done the paper will sink well into the minute angle made at the edges, such as 32, 33, of the strips of glue and the joints between the successive sections of the moulded areas will not be marked by any projecting ribs or like discontinuity of surface, which would be objectionable. The second stage of moulding the strips between those originally moulded on the cylinder 30 is illustrated in Figure 9. When the paper has been stripped off and the glue washed away the cylinder will be ready for use. It will be appreciated that the thicknesses of the films and sheet material generally have been grossly exaggerated in the figures for the purposes of illustration.

Referring to Figure 10, this shows a supply reel 40 carrying cellulose foil 41, a band of which is led beneath a roller 42 in a water bath 43 and thence around the diffractive-surfaced cylinder 30. The wet foil 41 is pressed against the cylinder 30 by a roller 44 at its on-going side, and a second roller 45 also presses on it at the take-off side, so that the foil is kept firmly in contact with the roller 30 throughout its period of travel between pressing rollers 44, 45.

The roller 30 is provided with internal heating means to bring it to a temperature somewhat above that of the room so that the wet foil will dry quickly while it is in contact with the roller and the speed of movement is made such that the foil is sufficiently dried by the time it reaches the roller 45 to permit of it retaining the surface-pattern which is impressed upon it by the roller 30. The paper is then fed on to a receiving spool 46 and will be found to bear a brilliant diffractive pattern corresponding to the pattern on the roller.

In an alternative method of producing a diffractive pattern on a cylinder or endless metal band which is intended to be used when diffractive foils are cast upon the cylinder or band in solution and allowed to dry thereon after stripping, which is suitable, for example, on cellulose acetate foils, the surface of the cylinder or band is finely finished and covered with glue containing a dichromate. Skins such as the skins 25 are squeegeed thereon over the whole surface while the glue is wet and when it has dried they are stripped, leaving the cylinder or band covered with diffractive gratings moulded in dichromate glue. This is preferably heated and if the heating is sufficient the glue is converted into a very hard enamel, although such heating is not essential for the casting of cellulose acetate foils. A temperature of, say, 250° C. for about five minutes will, however, convert the glue into a water-insoluble enamel sufficiently hard to act as a material on which foil may be cast, and which is water-resistant so that it could even be used instead of the Celluloid in treating "Cellophane" or like materials.

Apart from the preparation of transparent foils it is possible to mould non-transparent material such as coloured Celluloid sheet with a diffractive surface. Peculiarly beautiful effects are obtained if black sheets are moulded in this way. A convenient method of moulding patterns on Celluloid sheets consists in squeegeeing on to them gelatined paper such as the sheets 27 covered with the pattern 26, using a softening material such as pyroxylin solution between the two surfaces in a similar way to the solution 36 of Figures 8 and 9.

A wide variety of materials may be provided with diffraction rulings according to the invention. Thus, any regenerated or non-fibrous cellulosic material or cellulose ester or ether may be employed. The materials may be cast, or moulded in a swollen condition according to their respective properties of swelling or not. Further materials which may be used are paper impregnated with alginic acid and alginates. Substances which are capable of deformation under heat may also be impressed with diffraction rulings such, for example, as certain synthetic resins.

In the manufacture of synthetic resin moulded bodies with a diffractive surface in accordance with this invention the diffractive surface is impressed on the resin by using a mould lined in the appropriate parts with a diffractive surface either produced in hardened gelatine or glue or in metal or otherwise. Dichromated gelatine which has been baked at 250° C. to form a hard water-insoluble enamel as above described is sufficiently hard and heat-resistant to use for this purpose and gelatine replica films may therefore be used to line the mould. Alternatively the metal mould may be made by the cathode atomisation sputtering process in vacuo, sputtering the metal upon a moulded replica grating of any water-insoluble material, then electroplating the deposited metal film to obtain an appropriate thickness to use as a mould for the synthetic resin and finally detaching the original replica from the metal surface. The synthetic resin, which may be of any desired type such as, for example, a phenol formaldehyde condensation product, is then moulded on the hardened gelatine or metal surface, as the case may be.

The diffractive foils prepared according to the invention are particularly useful for ornamental and decorative purposes. When using transparent or translucent foils it is possible to enhance the effect by depositing a metallic film, for example, a gold or silver film, upon the unruled surface of the film by cathodic atomisation or other sputtering process.

One important application of the present invention lies in the production of display signs for advertising purposes. A display panel having a design of advertising matter executed on its surface as hereinabove described, when suitably mounted to display, in good contrast, the effects of light falling upon it, is arresting. For example, a shop window may have its surface coated with readily mouldable material such as gelatine, and if sheets of, say cellulose acetate film which have been moulded as described above to an appropriate design are pressed into contact with the gelatine while it is wet and then stripped after it is dry the design will be reproduced on the surface of the window and will appear in flashing colours to passers-by. The gelatine film in such a case can, if desired, be made more permanent by a hardening agent such as formalin or bichromate. Other applications are, for example, to transparent wrapping material for parcels, to the decoration of the surface of moulded objects, to the production of imitation mother-of-pearl and the like.

The effect can often be rendered particularly striking by using a transparent sheet material, the surface of which is formed into the desired design and placing behind it a sheet of material which does not reflect light, such as black paper. Alternatively, the back of the material itself can be blacked, or again the material which bears the impress of the design may be black or the effect may be modified by using various body colours or by, for example, coating with gold or silver or other metals. Various combinations of this method of decoration with other decorative effects can also be employed.

The accompanying drawings show by way of example a portion of an area which is covered with a design produced in accordance with the present invention. The various areas are shown hatched with parallel lines, the direction of which corresponds to the direction of the lines of the diffraction grating in each area, but of course it will be understood that the actual lines of the grating are invisible to the naked eye owing to their fineness. Such a design shows up in colour due to diffraction at the surface and the colours vary with the angle at which light falls upon the surface and the angle from which it is viewed. Moreover, when the position of the observer or the light source illuminating the design is altered the areas which show up in colour change. Although the particular design illustrated shows merely a "crazy" pattern, which is an effective one on transparent wrapping material, it will be understood that other designs of a more regular or even pictorial character can be executed.

In some cases good effects can be obtained by superimposing two or more layers of transparent diffraction-area designs one over another.

I claim:

1. A method of preparing casts of a diffraction surface of a desired area larger than the original diffraction surface which consists in successively forming from the said original a plurality of casts in the form of thin flexible skins each of which after being formed is stripped from the original surface to allow another cast to be made, laying these cast skins juxtaposed against one another upon the surface of a second material capable of receiving an impression therefrom so as to form an enlarged cast of the diffraction surface and thereafter taking a plurality of casts of the enlarged diffraction surface by applying directly thereto a material which is capable of being stripped therefrom after casting.

2. A method as claimed in claim 1, wherein the further casts are employed, juxtaposed with one another, upon a material capable of receiving an impression therefrom to build up a still further enlarged diffraction surface which is used as a matrix for the production of casts in a material capable of being stripped from the said matrix.

3. A method as claimed in claim 1, wherein the material with which the casts are brought into contact is a glue containing a hardening agent.

4. A method as claimed in claim 1, wherein the material employed for receiving impressions from the casts is a swollen gelatinous material and has the impression produced thereon by being allowed to dry in direct contact with the surface from which the impression is taken.

5. A method of forming a diffraction surface on film and sheet material, comprising the step of successively forming from an original diffraction surface smaller than the ultimately desired diffraction surface a plurality of casts in the form of thin flexible skins, each of which, after being formed, is stripped from the original surface to allow another cast to be made, laying these cast skins juxtaposed against one another upon the surface of a second material capable of receiving an impression therefrom so as to form an enlarged cast of the diffraction surface, and thereafter forming a diffraction surface upon a thin continuous transparent flexible film material from the enlarged diffraction surface.

THOMAS RALPH MERTON.